United States Patent [19]
Yew

[11] 3,995,605
[45] Dec. 7, 1976

[54] JET IGNITION ENGINE WITH SINGLY ACTUATED DUAL INLET VALVES

[75] Inventor: Ming-Chih Yew, Rochester, Mich.

[73] Assignee: General Motors Corporation, Detroit, Mich.

[22] Filed: Mar. 31, 1975

[21] Appl. No.: 563,779

[52] U.S. Cl. .......................... 123/75 B; 123/32 SP; 123/188 SC; 123/191 SP; 123/90.22

[51] Int. Cl.² ...................................... F02B 19/00

[58] Field of Search .......... 123/32 C, 32 D, 32 ST, 123/32 SP, 32 K, 75 B, 90.22, 90.23, 79 R, 79 C, 188 S, 188 VA, 188 AF, 188 SC, 191 S, 191 SP, DIG. 4

[56] References Cited
UNITED STATES PATENTS

| | | | |
|---|---|---|---|
| 1,568,638 | 1/1926 | Summers | 123/90.22 |
| 2,714,374 | 8/1955 | Hennig | 123/75 B |
| 3,174,470 | 3/1965 | VonSeggern et al. | 123/75 B |
| 3,211,137 | 10/1965 | Love | 123/75 B |
| 3,763,834 | 10/1973 | Geiger et al. | 123/32 SP |
| 3,832,984 | 9/1974 | Taguchi | 123/75 B |

*Primary Examiner*—Wendell E. Burns
*Assistant Examiner*—David D. Reynolds
*Attorney, Agent, or Firm*—Robert J. Outland

[57] ABSTRACT

An internal combustion engine having interconnected main and auxiliary combustion chambers, respectively, supplied with air-fuel mixtures through separate main and auxiliary intake passages is provided with an inlet valve having a single stem carrying two valve elements, one controlling each inlet port. At least one of the valve elements is resiliently positioned on the stem to permit relative movement between the elements and thus obtain positive seating of both valve elements on their respective valve seats. The arrangements permit actuation of the valve by conventional single valve actuating means.

3 Claims, 4 Drawing Figures

JET IGNITION ENGINE WITH SINGLY ACTUATED DUAL INLET VALVES

FIELD OF THE INVENTION

This invention relates to internal combustion engines and more particularly to novel inlet valve and port arrangements for engines of the spark-jet ignition type.

BACKGROUND OF THE INVENTION

It is known to provide a spark ignition engine with a small ignition chamber adjacent to and connected with a main combustion chamber in which combustion of a charge, ignited by a spark plug in the ignition chamber, causes a jet of flame to shoot into the main chamber and ignite the main charge therein. It is also known to provide a lean air-fuel mixture to the main combustion chamber through a main inlet port and a rich air-fuel mixture to the auxiliary or ignition chamber through a second and smaller inlet port. In the usual case, separate intake valves are provided to control the admission of the lean and rich mixtures to the two chambers. This provision usually requires dual or interconnected actuating means for actuating the dual inlet valves.

SUMMARY OF THE INVENTION

The present invention provides an inlet valve and port arrangement for a jet ignition engine in which dual inlet valves are carried on a single valve stem, movement of which by a single conventional valve actuating mechanism controls the admission of air-fuel mixtures through separate inlet ports to both the main and auxiliary chambers. Thus, the invention provides simple and economical means for controlling the intake of air-fuel mixtures to the main and auxiliary combustion chambers of a jet ignition engine.

These and other features and advantages of the invention will be more fully understoood from the following description of certain preferred embodiments taken together with the accompanying drawings.

DESCRIPTION OF THE ILLUSTRATED EMBODIMENTS

Figure 1:
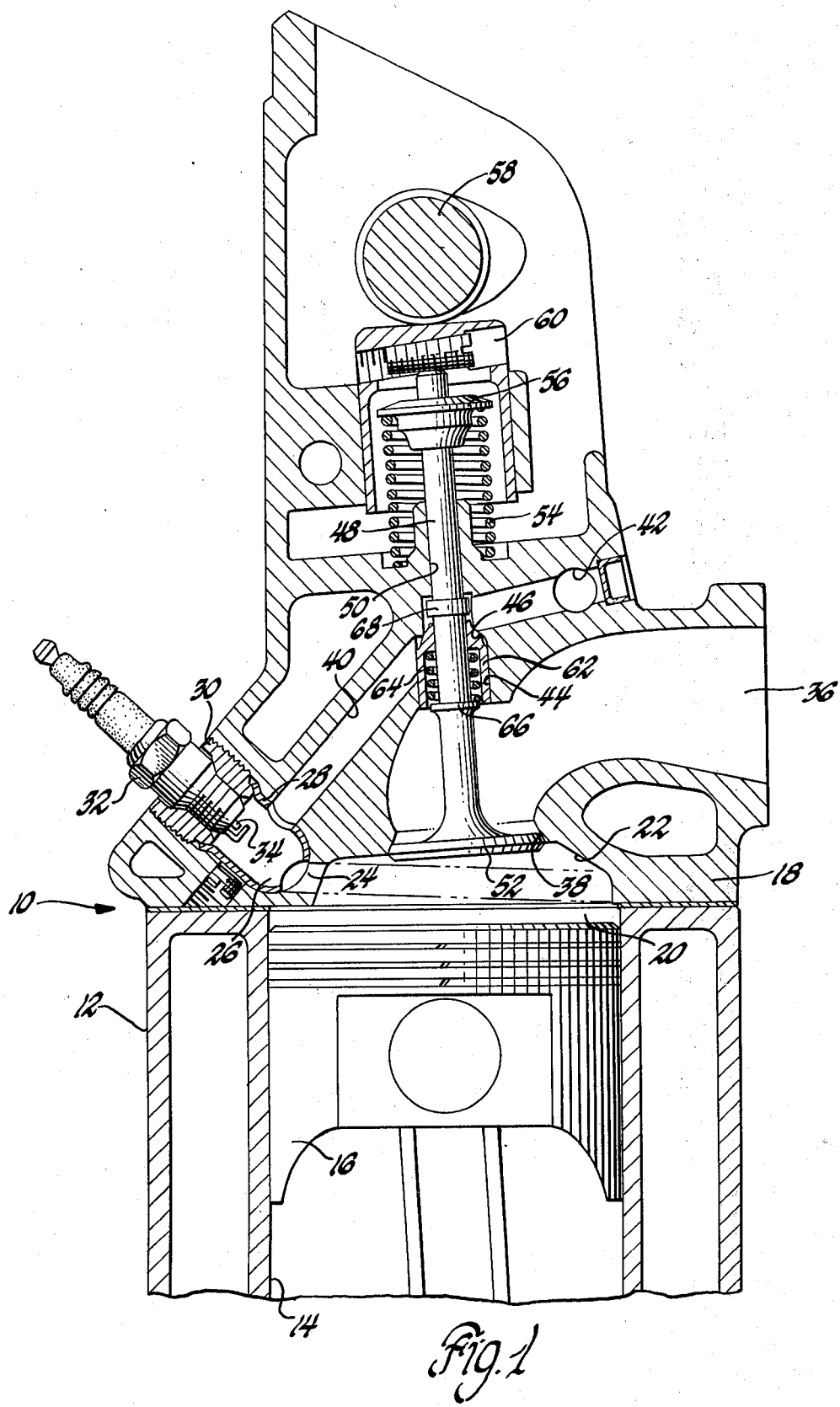
FIG. 1 is a cross-sectional view showing the pertinent parts of an internal combustion engine of the jet ignition type having dual inlet valve means formed according to the invention.

Referring first to FIG. 1 of the drawings, there is shown an internal combustion engine generally indicated by numeral 10. Engine 10 includes a cylinder block 12 defining a cylinder 14 in which there is reciprocably disposed a piston 16 connected through conventional means to crankshaft, not shown. The end of the cylinder 14 is closed by a cylinder head 18 to define with the cylinder and piston a combustion chamber 20 formed in part within a recess 22 of the cylinder head.

Adjacent the combustion chamber 20 and connected therewith by a restricted passage 24 is a small ignition chamber or auxiliary chamber 26 formed within the cylinder head and lined by a heat retaining insert 28, secured in place by a threaded plug 30. A spark plug 32 is mounted in the plug 30 and has electrodes 34 extending into the auxiliary chamber 26.

An inlet port 36 connecting with the combustion chamber 20 at a valve seat 38 is provided for the admission of air-fuel mixtures to the combustion chamber from external means, such as a carburetor, not shown. In similar fashion, an auxiliary inlet port 40 connects with the auxiliary chamber 26 and with a longitudinal gallery 42 connectable with means such as a carburetor, not shown, for supplying air-fuel mixtures to the auxiliary chamber. Intermediate the ends of the port 40 there is a cylindrical opening 44 extending between the two inlet ports 36, 40 and terminating in a valve seat 46 that surrounds the inlet port 40 at the end of the cylindrical opening.

The cylinder head is also provided with a dual inlet valve assembly having a valve stem 48 carried in a valve guide bore 50 of the cylinder head that extends in alignment with the opening 44. Valve stem 48 extends through bore 50 and opening 44 and terminates in a mushroom shaped head 52 that is seatable on the valve seat 38 to close communication of the main inlet port 36 with the main combustion chamber 20. A valve spring 54 extending between the cylinder head 18 and a spring cap 56 carried on the end of the valve stem 48 biases the valve upwardly, in a direction to seat the valve head 52. The valve is openable by means of a cylinder head carried camshaft 58 which engages a mechanically adjustable tappet 60 carried in the cylinder head and engaging the end of the valve stem 48.

Also carried on the valve stem is a sleeve-like valve element 62 that is slidably mounted on the valve stem and within the cylindrical opening 44, blocking communication through the opening between the inlet ports 36 and 40. A second spring 64 extends between an annular abutment 66 on the valve stem and the valve element 62, biasing the element upwardly in a direction toward engagement with the valve seat 46 so as to close the auxiliary inlet port 40.

An annular stop member or abutment 68 is also provided on the valve stem and positioned to engage the valve element 62 upon a slight opening movement of the valve stem 48 so as to move the valve element 62 in an opening direction along with the main valve head 52. Thus, upon closing of the dual valve assembly, as controlled by rotation of the camshaft 58, the auxiliary valve element 62 engages valve seat 46 slightly before head 52 engages valve seat 38, the additional movement of the valve stem to close the main port 36 being permitted by yielding of the spring 64 between the element 62 and the valve stem 48.

Figure 2:
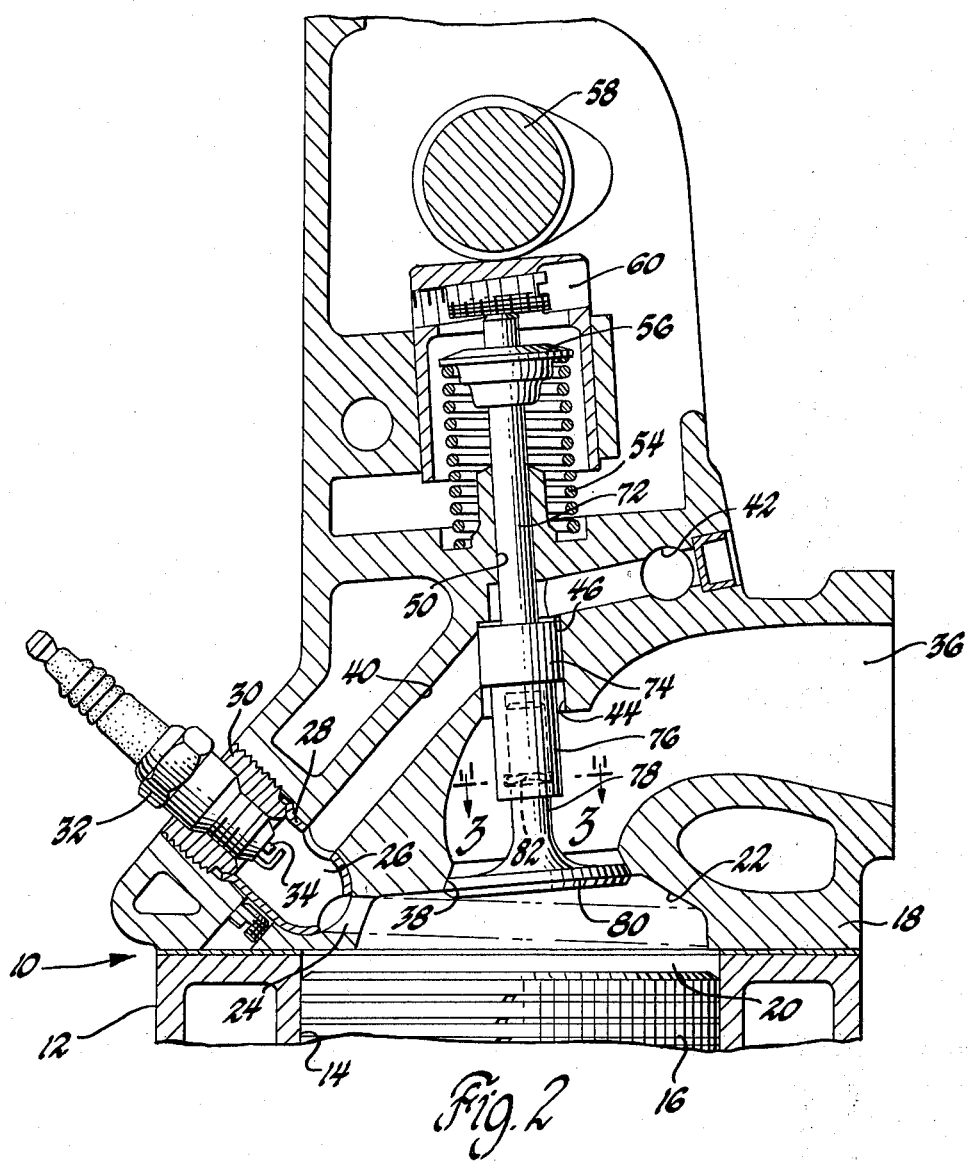
FIG. 2 is a cross-sectional view similar to FIG. 1, but showing an engine having an alternative form of inlet valve means formed according to the invention.
Figure 3:
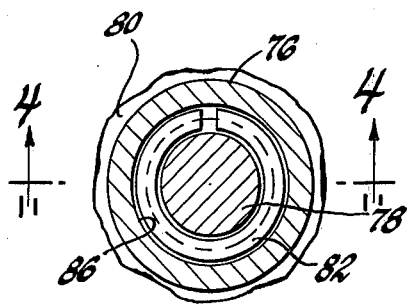
FIG. 3 is a horizontal cross-sectional view through the valve assembly showing the valve spring retainer arrangement and taken in the plane generally indicated by the line 3—3 of FIG. 2.
Figure 4:
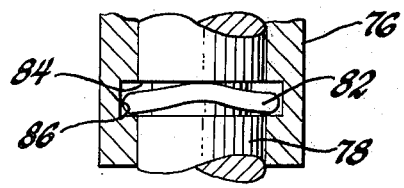
FIG. 4 is a vertical cross-sectional view taken in the plane indicated by the line 4—4 of FIG. 3 and showing further details of the spring retainer arrangement.

Referring now to FIGS. 2–4 of the drawings, there is shown an engine of the same general construction as that of FIG. 1, differing only in the arrangement of the dual valve assembly for controlling the main and auxiliary ports. The construction differs primarily in that the auxiliary valve portion is formed integral with the valve stem, while the main head element is connected with the valve stem through a yielding wire clip or spring arrangement.

Specifically, the alternative dual valve construction includes a valve stem 72 reciprocably carried in the valve guide bore 50 and integrally formed with a cylindrical valve element 74 that is engagable with the valve seat 46 of the auxiliary inlet passage 40. A hollow extension 76 of the valve stem 72 receives a stub like stem 78 connected with a main valve head 80 that is seatable on valve seat 38. A spring clip 82 carried in mating grooves 84, 86 of the stub 78 and stem 76, respectively, retains the stub 78 within the stem 76 and provides a yieldable connection that permits the main head 80 to seat slightly before the auxiliary valve element 74.

The construction of the auxiliary valve element is such that the valve seat 46 could be dispensed with and control of the port 40 be maintained by movement of the cylindrical element 74 to close off the port in the manner of a spool valve land. A similar modification could also be applied to the auxiliary valve element arrangement of the FIG. 1 embodiment.

While reference has been made to only a single cylinder location of the engine arrangements described for illustrative purposes, it is to be understood that such engines will usually include a plurality of aligned cylinders in the cylinder block, each having an inlet port and valve arrangement and other elements similar to the described cylinder. Since various changes may be made without departing from the concepts disclosed, it is intended that the invention not be limited to the embodiments disclosed, but only by the language of the following claims.

What is claimed is:

1. An internal combustion engine of the type having means defining a main combustion chamber and an auxiliary combustion chamber connected with said main chamber by a restricted opening, a first inlet port connecting with said main chamber at a first valve seat, a second inlet port connecting with said auxiliary chamber, and the improvement comprising dual intake valve means to control both of said inlet ports, said valve means comprising
   a stem reciprocably carried in said engine and extending through said second inlet port, and a second valve seat in said second port, and surrounding said valve stem,
   first and second valve elements carried on said stem, said first valve element comprising a mushroom shaped head carried at the end of said stem and seatable against said first valve seat to close communication of said first inlet port with said main chamber, said second valve element being carried intermediate the ends of said stem and engagable with said second valve seat to close said second port, one of said valve elements being arranged for limited reciprocation on said stem,
   first spring means acting on said valve stem and urging said stem in direction to close said valve elements,
   second spring means acting between said stem and said one valve element and urging said one valve element toward a position wherein it will be seated in advance of the other of said valve elements upon closing movement of said stem, said second spring means being yieldable upon seating of said one valve element to permit continued closing motion of said valve stem until seating of said other valve element, and
   actuating means engagable with said valve stem for opening said valve elements.

2. An internal combustion engine having means defining a main combustion chamber; an auxiliary combustion chamber adjacent the main combustion chamber and connected therewith by a restricted opening, a first inlet port connecting with said main chamber at a first valve seat, a second inlet port connecting with said auxiliary chamber and the improvements comprising
   a valve guide bore in said chamber defining means, connecting with said first and second inlet ports and having an enlarged portion adjacent the second inlet port,
   a second valve seat located at the junction of said second inlet port and said valve guide bore and extending around both,
   a valve having a stem reciprocably mounted in said valve guide bore and a head seatable against said first valve seat to close said first inlet port, said valve stem extending through said second inlet port, and spring means biasing said valve to urge said head in a closing direction toward said first seat
   a valve element slidably mounted on said valve stem within the enlarged portion of said guide bore and seatable on said second valve seat to close said second inlet port, spring means between said valve and said valve element and biasing said element toward said valve seat and a stop on said valve stem and engagable with said valve element upon a small opening movement of said valve to open said valve element upon opening of said valve head, and
   actuating means engagable with said valve stem to actuate said valve and said valve element in an opening direction.

3. An internal combustion engine having means defining a main combustion chamber; an auxiliary combustion chamber adjacent the main combustion chamber and connected therewith by a restricted opening, a first inlet port connecting with said main chamber at a first valve seat, a second inlet port connecting with said auxiliary chamber and the improvements comprising
   a valve guide bore in said chamber defining means, connecting with said first and second inlet ports and having an enlarged portion adjacent the second inlet port,
   a second valve seat located at the junction of said second inlet port and said valve guide bore and extending around both,
   a valve having a stem reciprocably mounted in said valve guide bore and an enlarged auxiliary head in said enlarged portion and seatable against said second valve seat to close said second inlet port, and spring means biasing said valve in a closing direction toward said second seat
   a valve element slidably supported by said valve stem, said element comprising a main head seatable against said first valve seat to close said first inlet port and spring means between said valve stem and said valve element and arranged to yield after seating of said valve element on said first valve seat to permit further closing movement of said valve stem to seat said auxiliary valve head on said second valve seat, and
   actuating means engagable with said valve stem to actuate said valve and thereby said valve element in an opening direction.

* * * * *